US005983539A

United States Patent [19]
Martin et al.

[11] Patent Number: 5,983,539
[45] Date of Patent: Nov. 16, 1999

[54] TAG LOCK

[76] Inventors: Brian Martin; Lori A. Tinnirello, both of 2801 N. Course Dr. #F208, Pompano Beach, Fla. 33069

[21] Appl. No.: 09/042,448

[22] Filed: Mar. 16, 1998

[51] Int. Cl.[6] ..................................................... G09F 7/00
[52] U.S. Cl. .............................. 40/202; 40/201; 40/209; 40/655
[58] Field of Search ............................ 40/201, 202, 209, 40/655

[56]            References Cited

U.S. PATENT DOCUMENTS 2,710,475   6/1955   Salzmann ................................. 40/202
3,432,954   3/1969   Ford ........................................ 40/202
5,012,602   5/1991   Storey .................................... 40/202 X
5,404,664   4/1995   Brooks et al. .......................... 40/202
5,659,986   8/1997   Simmons ................................ 40/202
5,870,841   2/1999   Brody, II et al. .................... 40/209 X

FOREIGN PATENT DOCUMENTS

2266986 A   11/1993   United Kingdom ..................... 40/202

*Primary Examiner*—Terry Lee Melius
*Assistant Examiner*—Rodrigo J. Morales

[57]            ABSTRACT

A tag lock is provided which is constructed from a transparent material. The cover is hingably coupled over a license plate for selectively protecting the same.

1 Claim, 2 Drawing Sheets

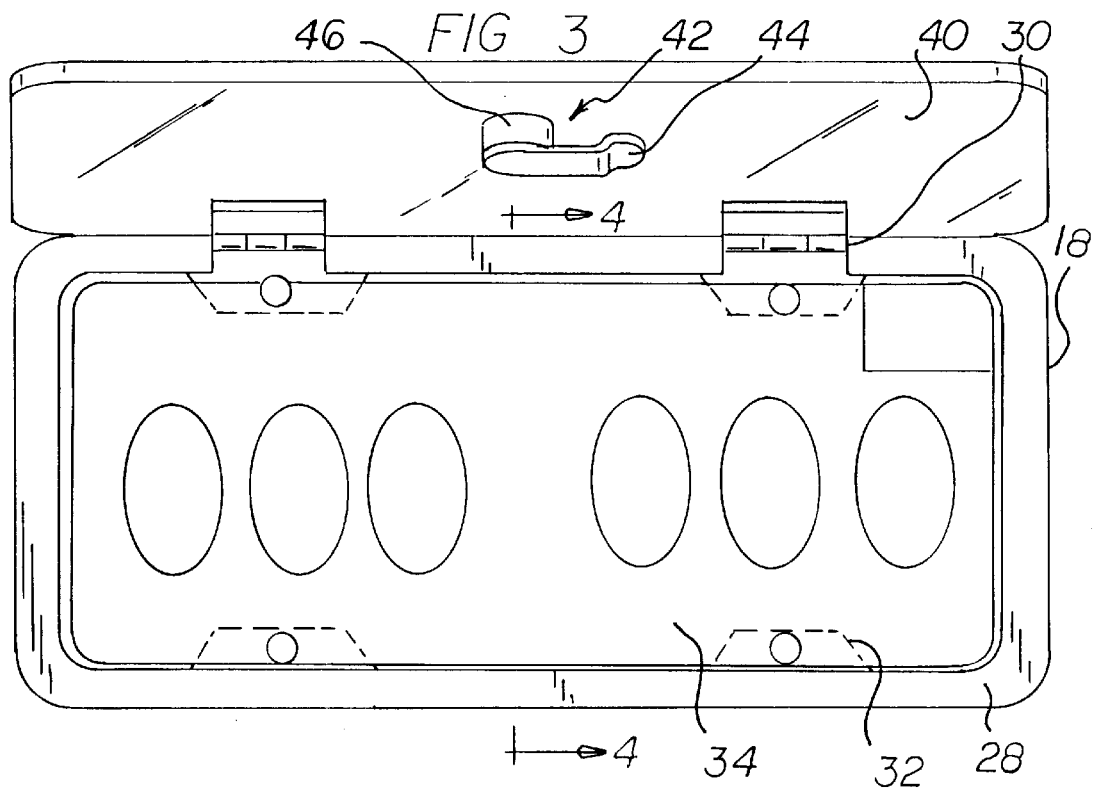
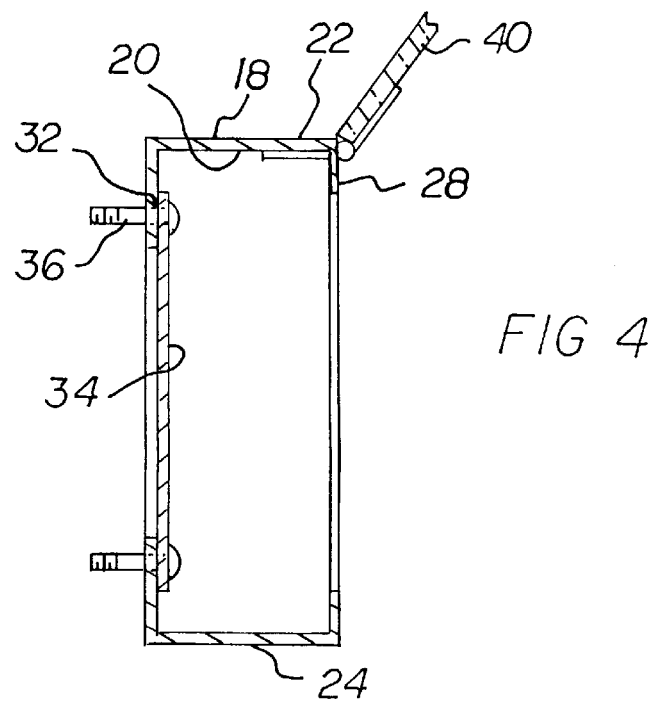

TAG LOCK

BACKGROUND OF THE INVENTION

1. Field of the Invention

The present invention relates to a tag lock and more particularly pertains to protecting a license plate and registration stickers against damage and theft.

2. Description of the Prior Art

The use of license plate protection devices is known in the prior art. More specifically, license plate protection devices heretofore devised and utilized for the purpose of protecting a license plate are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 1,573,113; U.S. Pat. No. 1,829,824; U.S. Pat. No. 2,603,015; U.S. Pat. No. 3,304,642; U.S. Pat. No. 3,340,604; U.S. Pat. No. 3,389,486; U.S. Pat. No. 3,685,188; U.S. Pat. No. 3,702,510; U.S. Pat. No. 4,179,838; U.S. Pat. No. 4,182,062; U.S. Pat. No. 5,404,664; and U.S. Pat. No. 5,503,420.

In this respect, the tag lock according to the present invention substantially departs from the conventional concepts and designs of the prior art, and in so doing provides an apparatus primarily developed for the purpose of protecting a license plate and registration stickers against damage and theft.

Therefore, it can be appreciated that there exists a continuing need for a new and improved tag lock which can be used for protecting a license plate and registration stickers against damage and theft. In this regard, the present invention substantially fulfills this need.

SUMMARY OF THE INVENTION

In view of the foregoing disadvantages inherent in the known types of license plate protection devices now present in the prior art, the present invention provides an improved tag lock. As such, the general purpose of the present invention, which will be described subsequently in greater detail, is to provide a new and improved tag lock which has all the advantages of the prior art and none of the disadvantages.

To attain this, the present invention essentially comprises a vehicle with a rear extent having a bumper attached thereto. A plurality of threaded bores are formed in the rear extent of the vehicle above the bumper for reasons that will become apparent hereinafter. Next provided is a housing including a rectangular side wall. As shown in the Figures, the side wall is defined by a planar rectangular elongated top face, a planar rectangular elongated bottom face, and a pair of planar rectangular short side faces coupled therebetween. As such, an open rectangular rear face with an associated free rear peripheral edge is afforded along with an open rectangular front face with an associated free front peripheral edge. The front peripheral edge of the housing is equipped with a peripheral lip integrally coupled thereto and extending inwardly therefrom in perpendicular relationship with the side wall. The peripheral lip has a pair of spaced rectangular cut outs formed therein along a top extent thereof. The rear peripheral edge has a plurality of tabs each integrally coupled thereto and extending inwardly therefrom in perpendicular relationship with the side wall. Each tab has an aperture formed therein. Next provided is a license plate having a planar rectangular configuration with a plurality of apertures formed along a periphery thereof. In use, the license plate is situated within the side wall against an inner surface of the tabs of the housing. A plurality of bolts extend through the apertures of the tabs and the license plate. The bolts are further screwably coupled to the threaded bores of the vehicle. As such, the rear peripheral edge of the housing sealingly abuts the rear extent of the vehicle. A cover is provided which is constructed from a rigid transparent material. The cover has a planar rectangular configuration with a periphery defined by an elongated top edge, an elongated bottom edge and a pair of short side edges. The cover has a pair of hinges each with an outboard portion mounted to an interior surface of the cover. Associated therewith is an inboard portion mounted to an interior surface of the top face of the housing. The hinges extend through the cut outs formed in the front peripheral lip of the housing. This allows the cover to pivot between an open orientation and a closed orientation. Finally, a locking assembly includes a locking arm having an inboard end rotatably coupled to the interior surface of the cover adjacent to the bottom edge thereof. An outboard end of the locking arm resides in a plane offset and parallel to that in which the inboard end resides. The locking assembly further includes a key mechanism coupled to the inboard end of the locking arm and extended through the cover.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved tag lock which has all the advantages of the prior art license plate protection devices and none of the disadvantages.

It is another object of the present invention to provide a new and improved tag lock which may be easily and efficiently manufactured and marketed.

It is a further object of the present invention to provide a new and improved tag lock which is of a durable and reliable construction.

An even further object of the present invention is to provide a new and improved tag lock which is susceptible of a low cost of manufacture with regard to both materials and labor, and which accordingly is then susceptible of low prices of sale to the consuming public, thereby making such tag lock economically available to the buying public.

Still yet another object of the present invention is to provide a new and improved tag lock which provides in the apparatuses and methods of the prior art some of the advantages thereof, while simultaneously overcoming some of the disadvantages normally associated therewith.

Still another object of the present invention is to protect a license plate with a pivotable cover.

Lastly, it is an object of the present invention to provide a new and improved tag lock is provided which is constructed from a transparent material. The cover is hingably coupled over a license plate for selectively protecting the same.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a front view of the present invention with the cover in its open orientation.

FIG. 4 is side cross-sectional view of the present invention taken along line 4–4 shown in FIG. 3.

Similar reference characters refer to similar parts throughout the several views of the drawings.

DESCRIPTION OF THE PREFERRRED EMBODIMENT

Figure 1:
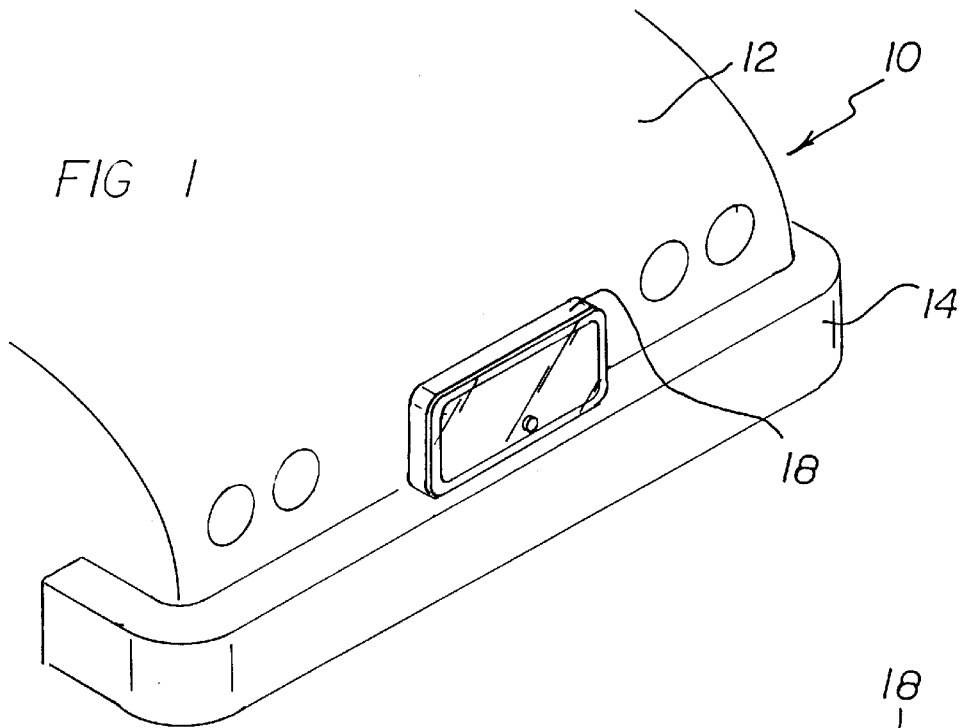
FIG. 1 is a perspective illustration of the preferred embodiment of the tag lock constructed in accordance with the principles of the present invention.
Figure 2:
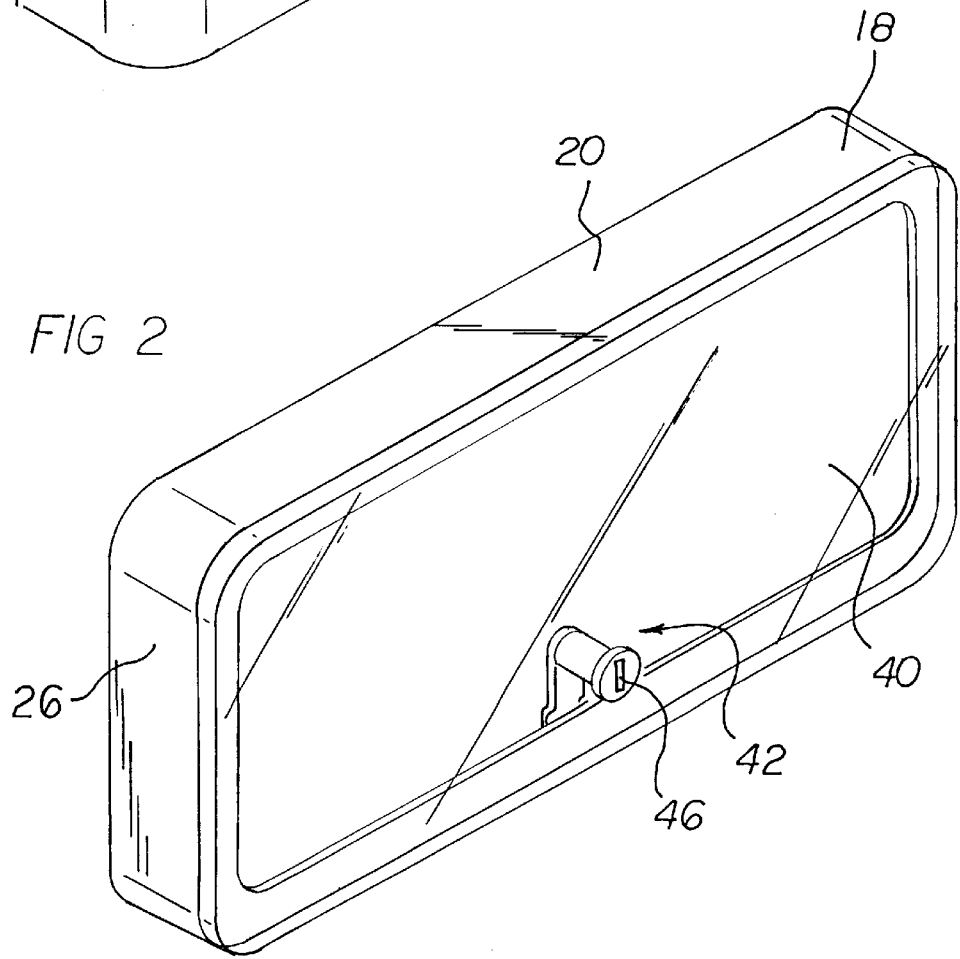
FIG. 2 is a detailed perspective view of the present invention.

With reference now to the drawings, and in particular to FIG. 1 thereof, a new and improved tag lock embodying the principles and concepts of the present invention and generally designated by the reference numeral 10 will be described.

The present invention, the new and improved tag lock, is comprised of a plurality of components. Such components in their broadest context include a housing, cover and locking assembly. Such components are individually configured and correlated with respect to each other so as to attain the desired objective.

More specifically, it will be noted that the system 10 of the present invention, designated as numeral 10, includes a vehicle 12 with a rear extent having a bumper 14 attached thereto. A plurality of threaded bores are formed in the rear extent of the vehicle above the bumper for reasons that will become apparent hereinafter.

Next provided is a housing 18 including a rectangular side wall 20. As shown in the Figures, the side wall is defined by a planar rectangular elongated top face 22, a planar rectangular elongated bottom face 24, and a pair of planar rectangular short side faces 26 coupled therebetween. As such, an open rectangular rear face with an associated free rear peripheral edge is afforded along with an open rectangular front face with an associated free front peripheral edge. In the preferred embodiment, the side wall has a depth of at least 2 inches thereby rendering a suitable interior space.

The front peripheral edge of the housing is equipped with a peripheral lip 28 integrally coupled thereto and extending inwardly therefrom in perpendicular relationship with the side wall. Ideally, the lip extends inwardly about ¼ the depth of the side wall. The peripheral lip has a pair of spaced rectangular cut outs 30 formed therein along a top extent thereof. The rear peripheral edge has a plurality of tabs 32 each integrally coupled thereto and extending inwardly therefrom in perpendicular relationship with the side wall. Each tab has an aperture formed therein and extends inwardly about ½ the depth of the side wall.

Next provided is a license plate 34 having a planar rectangular configuration with a plurality of apertures formed along a periphery thereof. In use, the license plate is situated within the side wall against an inner surface of the tabs of the housing. A plurality of bolts 36 extend through the apertures of the tabs and the license plate. The bolts are further screwably coupled to the threaded bores of the vehicle. As such, the rear peripheral edge of the housing sealingly abuts the rear extent of the vehicle.

A cover 40 is provided which is constructed from a rigid transparent material. For use in states where license covers are prohibited, the transparent material preferably is of a non-glare type which utilizes a coating, film or the like. The cover has a planar rectangular configuration with a periphery defined by an elongated top edge, an elongated bottom edge and a pair of short side edges. The cover has a pair of hinges each with an outboard portion mounted to an interior surface of the cover. Associated therewith is an inboard portion mounted to an interior surface of the top face of the housing. The hinges extend through the cut outs formed in the front peripheral lip of the housing. This allows the cover to pivot between an open orientation and a closed orientation. In the closed orientation, the interior surface of the cover abuts an outer surface of the front peripheral lip of the housing. As an option, a gasket may be included to provide a seal between the cover and the housing.

Finally, a locking assembly 42 includes a locking arm 44 having an inboard end rotatably coupled to the interior surface of the cover adjacent to the bottom edge thereof. An outboard end of the locking arm resides in a plane offset and parallel to that in which the inboard end resides. The locking assembly further includes a key mechanism 46 coupled to the inboard end of the locking arm and extended through the cover.

By this structure, the locking arm may be selectively rotated to engage an interior surface of the front peripheral lip of the housing when the cover is in its closed orientation for locking purposes. Preferably, the aforementioned rotation is allowed only with a key thereby precluding unauthorized access to the license plate. In the alternative, an electronic locking assembly may be employed in lieu of the mechanical version set forth hereinabove. Such electronic version may employ a code and keypad to preclude unauthorized access.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved tag lock for a vehicle with a rear extent having a bumper attached thereto and a plurality of threaded bores formed therein above the bumper, the tag lock comprising:

a housing including a rectangular side wall defined by a planar rectangular elongated top face, a planar rectangular elongated bottom face, and a pair of planar rectangular short side faces coupled therebetween to define an open rectangular rear face with an associated free rear peripheral edge and an open rectangular front face with an associated free front peripheral edge, the front peripheral edge having a peripheral lip integrally coupled thereto and extending inwardly therefrom in perpendicular relationship with the side wall, the peripheral lip having a pair of spaced rectangular cut outs formed therein along a top extent thereof, the rear peripheral edge having a plurality of tabs each integrally coupled thereto and extending inwardly therefrom in perpendicular relationship with the side wall, each tab having an aperture formed therein;

a license plate having a planar rectangular configuration with a plurality of apertures formed along a periphery thereof, wherein the license plate is situated within the side wall against an inner surface of the tabs of the housing such that a plurality of bolts extend through the apertures of the tabs and the license plate and further screwably coupled to the threaded bores of the vehicle so that the rear peripheral edge of the housing sealingly abuts the rear extent of the vehicle;

a cover constructed from a rigid transparent material, the cover having a planar rectangular configuration with a periphery defined by an elongated top edge, an elongated bottom edge and a pair of short side edges, the cover having a pair of hinges each with an outboard portion mounted to an interior surface of the cover and an inboard portion mounted to an interior surface of top face of the housing, wherein the hinges extend through the cut outs formed in the front peripheral lip of the housing thereby allowing the cover to pivot between an open orientation and a closed orientation; and a locking assembly including a locking arm having an inboard end rotatably coupled to the interior surface of the cover adjacent to the bottom edge thereof and an outboard end residing in a plane offset and parallel to that in which the inboard end resides, the locking assembly further including a key mechanism coupled to the inboard end of the locking arm and extending through the cover, whereby the locking arm may be selectively engaged with an interior surface of the front peripheral lip of the housing via a key for locking purposes.

\* \* \* \* \*